United States Patent
Kalamaras et al.

(10) Patent No.: US 11,235,281 B2
(45) Date of Patent: *Feb. 1, 2022

(54) MULTI-POLLUTANT EXHAUST TREATMENT USING SEAWATER FOR MARINE APPLICATIONS

(71) Applicant: Saudi Arabian Oil Company, Dhahran (SA)

(72) Inventors: Christos M. Kalamaras, Al Khobar (SA); Esam Z. Hamad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,777

(22) Filed: Jul. 20, 2020

(65) Prior Publication Data

US 2021/0069642 A1  Mar. 11, 2021

Related U.S. Application Data

(63) Continuation of application No. 16/565,196, filed on Sep. 9, 2019, now Pat. No. 10,717,044.

(51) Int. Cl.
| | |
|---|---|
| *C01B 11/06* | (2006.01) |
| *B01D 1/00* | (2006.01) |
| *B01D 1/28* | (2006.01) |
| *B01D 53/50* | (2006.01) |
| *B01D 53/56* | (2006.01) |
| *B01D 53/62* | (2006.01) |
| *B01D 53/78* | (2006.01) |
| *C02F 1/44* | (2006.01) |
| *C02F 1/469* | (2006.01) |
| *C02F 1/04* | (2006.01) |
| *C02F 5/02* | (2006.01) |
| *C02F 1/42* | (2006.01) |
| *C02F 1/461* | (2006.01) |
| *C02F 101/10* | (2006.01) |
| *C02F 103/08* | (2006.01) |

(52) U.S. Cl.
CPC .......... *B01D 53/78* (2013.01); *B01D 1/0058* (2013.01); *B01D 1/28* (2013.01); *B01D 53/502* (2013.01); *B01D 53/56* (2013.01); *B01D 53/62* (2013.01); *C01B 11/062* (2013.01); *B01D 2251/304* (2013.01); *B01D 2257/302* (2013.01); *B01D 2257/404* (2013.01); *B01D 2257/504* (2013.01); *B01D 2258/012* (2013.01); *C02F 1/041* (2013.01); *C02F 1/42* (2013.01); *C02F 1/441* (2013.01); *C02F 1/442* (2013.01); *C02F 1/461* (2013.01); *C02F 1/4693* (2013.01); *C02F 5/02* (2013.01); *C02F 2001/425* (2013.01); *C02F 2101/101* (2013.01); *C02F 2103/08* (2013.01); *C02F 2201/001* (2013.01); *C02F 2201/009* (2013.01); *C02F 2303/10* (2013.01)

(58) Field of Classification Search
CPC ............ B01D 53/1456; B01D 53/1475; B01D 53/1481; B01D 53/501; B01D 53/60; B01D 53/54; B01D 53/78; B01D 53/92; B01D 2251/304; B01D 2252/1035; B01D 2257/302; B01D 2257/402; B01D 2257/404; B01D 2257/504; B01D 2258/012; F01N 3/0842; F01N 3/085; F01N 3/0857; F01N 13/004; F01N 2250/14; F01N 2570/10; F01N 2570/04; F01N 2590/02

See application file for complete search history.

(56) References Cited

U.S. PATENT DOCUMENTS

| | | |
|---|---|---|
| 6,280,505 B1 | 8/2001 | Torkildsen et al. |
| 7,488,461 B2 | 2/2009 | Nagaysu et al. |
| 8,741,244 B2 | 6/2014 | Jones |
| 9,914,094 B2 | 3/2018 | Jenkins et al. |
| 10,717,044 B1 * | 7/2020 | Kalamaras ............. B01D 3/065 |

(Continued)

FOREIGN PATENT DOCUMENTS

| | | |
|---|---|---|
| TW | 201408598 | 3/2014 |
| WO | WO 2006034339 | 3/2006 |

(Continued)

OTHER PUBLICATIONS

PCT International Search Report and Written Opinion issued in International Appln. No. PCT/US2020/049867, dated Oct. 14, 2020, 12 pages.

(Continued)

*Primary Examiner* — Timothy C Vanoy
(74) *Attorney, Agent, or Firm* — Fish & Richardson P.C.

(57) ABSTRACT

Marine engine exhaust includes pollutants such as $CO_2$, $NO_x$ and $SO_x$. An onboard system and method for the simultaneous removal of these pollutants includes obtaining seawater from the water on which the marine vessel travels, purifying the seawater to remove a portion of hard ions, concentrating the seawater to yield a concentrated brine solution, treating the concentrated brine solution with a chemical softener to yield a treated brine solution, acidifying the treated brine solution, and utilizing the acidified brine solution in a chlor-alkali process to yield sodium hydroxide. The sodium hydroxide can be used in an acid gas scrubber to remove $CO_2$, $NO_x$, and $SO_x$ from the marine engine exhaust gas.

20 Claims, 4 Drawing Sheets

(56) References Cited

U.S. PATENT DOCUMENTS

2012/0049114 A1   3/2012   Seeker et al.
2017/0326497 A1   11/2017  Verbakel et al.
2019/0085472 A1   3/2019   Willauer et al.

FOREIGN PATENT DOCUMENTS

WO   WO 2011016781   2/2011
WO   WO 2012128721   9/2012

OTHER PUBLICATIONS

An et al., "Marine Air Pollution Control System Development Applying Seawater and Electrolyte," SAE International, Jul. 15, 2002, abstract only, 2 pages.
An, "New Application of Seawater and Electrolyzed Seawater in Air Pollution Control of Marine Diesel Engine," JSME International Journal, Series B, vol. 46, No. 1, 2003, 8 pages.
Damen Green Solutions (DGS), "SO x Scrubbing Made Simple," Damen Green Solutions, retrieved from URL <http://www.damengreen.com/en/sox-scrubbing>, available on or before 2019, 7 pages.
ULF Technology,"CSNx," Ecospec Global Technology, 2015, 2 pages.
Wartsila, "Product guide: SO x scrubber technology," Wartsila Exhaust Gas Cleaning, 2017, 8 pages.

\* cited by examiner

MULTI-POLLUTANT EXHAUST TREATMENT USING SEAWATER FOR MARINE APPLICATIONS

CROSS-REFERENCE TO RELATED APPLICATIONS

This application is a continuation application of, and claims the benefit of priority to, U.S. application Ser. No. 16/565,196, filed on Sep. 9, 2019, the contents of which are hereby incorporated by reference.

TECHNICAL FIELD

This disclosure relates to treating pollutants in the engine exhaust of a marine vessel using seawater.

BACKGROUND

Emissions derived from maritime transport and inland shipping include carbon dioxide ($CO_2$), nitrogen oxides ($NO_x$), and sulphur oxides ($SO_x$). Environmental studies have shown that marine diesel engines are the largest atmospheric polluters of the two latter: $NO_x$ and $SO_x$.

Recent international regulations and commitments seek to limit exhaust gas emissions, however, there is little experience in shipping related emission-reducing technologies, relative to the industrial and energy sector. Moreover, in the shipping industry, the removal of $NO_x$, $SO_x$ and $CO_2$ from exhaust gases is commonly done separately. Combining these methods, such as combining $SO_2$ scrubbing together with selective catalytic reduction (SCR) followed by $CO_2$ capture, is extremely costly. Therefore, the effective, efficient and simultaneous removal of pollutants from engine exhaust gas is an important part of marine commerce.

SUMMARY

This disclosure describes a method and apparatus for removing multiple pollutants from the engine exhaust gas of a marine engine using seawater.

Certain aspects of the subject matter described here can be implemented as a method for treating engine exhaust gas emitted by a marine engine onboard a marine vessel. On board the marine vessel, a portion of seawater on which the marine vessel travels is obtained. The portion of the seawater is treated to remove portions of calcium, magnesium and sulfate ions from the portion of the seawater to yield a treated portion of seawater. The treated portion of the seawater is concentrated to yield a concentrated brine solution. The concentrated brine solution is treated with a softener to yield a treated brine solution. The treated brine solution is acidified to yield an acidic brine solution. The acidic brine solution is processed with a chlor-alkali unit to yield hydrogen gas, chlorine gas and sodium hydroxide. The sodium hydroxide is reacted in a scrubber unit with the engine exhaust gas to remove carbon dioxide, $SO_x$, and $NO_x$ from the engine exhaust gas.

An aspect, combinable with any of the other aspects, can include the following features. The treated portion of the seawater is concentrated to yield potable water.

An aspect, combinable with any of the other aspects, can include the following features. The treated portion of the seawater is concentrated with one or more of a reverse osmosis process, an electrodialysis process, a multi-stage flash distillation process, a multi-effect distillation process, or a mechanical vapor compression process.

An aspect, combinable with any of the other aspects, can include the following features. The treated portion of the seawater is concentrated with an electrodialysis process powered by a fuel cell. The fuel cell is powered with hydrogen gas produced by the chlor-alkali unit.

An aspect, combinable with any of the other aspects, can include the following features. The treated portion of the seawater is concentrated with a mechanical vapor compression process. The mechanical vapor compression process includes a compressor powered by the engine that compresses vapor produced by evaporation. The mechanical vapor compression process includes a preheating heat exchanger that recovers heat from the compressed vapor. The mechanical vapor compression process includes an evaporator that is powered by the recovered heat and evaporates the treated portion of the seawater to yield the concentrated brine solution.

An aspect, combinable with any of the other aspects, can include the following features. The concentration of sodium chloride in the treated portion of the seawater is increased to up to 26% by weight to yield the concentrated brine solution.

An aspect, combinable with any of the other aspects, can include the following features. Chlorine and hydrogen gas generated by the chlor-alkali process are converted into hydrochloric acid. The hydrochloric acid is used to acidify the treated brine solution.

An aspect, combinable with any of the other aspects, can include the following features. The chlorine gas is reacted with sodium hydroxide to yield sodium hypochlorite.

An aspect, combinable with any of the other aspects, can include the following features. The hydrogen gas generated by the chlor-alkali process is combusted in the marine engine.

An aspect, combinable with any of the other aspects, can include the following features. The sodium hydroxide is reacted with the engine exhaust gas in the scrubber unit to yield sodium bicarbonate.

An aspect, combinable with any of the other aspects, can include the following features. The sodium bicarbonate is used as the softener to treat the concentrated brine solution.

An aspect, combinable with any of the other aspects, can include the following features. The engine exhaust gas passes through a waste heat recovery unit before the engine exhaust gas is reacted with the sodium hydroxide. Heat is recovered from the engine exhaust gas by the waste heat recovery unit.

An aspect, combinable with any of the other aspects, can include the following features. The heat recovered from the waste heat recovery unit is utilized by the mechanical vapor compression process.

An aspect, combinable with any of the other aspects, can include the following features. The sodium hydroxide and the engine exhaust gas react to yield solid and liquid products and byproducts. These solids and liquids are separated using a separation unit.

An aspect, combinable with any of the other aspects, can include the following features. The sodium hydroxide is reacted in a scrubber unit. The scrubber unit is at least one of a packed tower, wet-film, impingement-plate or tray-tower scrubber.

An aspect, combinable with any of the other aspects, can include the following features. A system for treating an engine exhaust gas emitted by a marine engine onboard a marine vessel uses a portion of seawater from the seawater on which the marine vessel travels. A treatment unit removes portions of calcium, magnesium and sulfate ions from the portion of the seawater to yield a treated portion of the seawater. One or more concentration units concentrate the treated portion of the seawater to yield a concentrated brine solution. A chemical softening unit further removes calcium and magnesium ions from the concentrated brine solution to yield a treated brine solution. An acidifying unit acidifies the treated brine solution to yield an acidic brine solution. A chlor-alkali unit electrolyzes sodium chloride in the acidic brine solution to yield hydrogen gas, chlorine gas, and sodium hydroxide. An acid gas scrubber reacts the sodium hydroxide with the engine exhaust gas. The solid and liquid products and byproducts of the reaction between sodium hydroxide and the engine exhaust gas are separated by a separator.

An aspect, combinable with any of the other aspects, can include the following features. The one or more concentration units include at least one of a reverse osmosis, an electrodialysis, a multi-stage flash distillation, a multi-effect distillation, or a mechanical vapor compression unit.

An aspect, combinable with any of the other aspects, can include the following features. The electrodialysis unit is powered by a fuel cell.

An aspect, combinable with any of the other aspects, can include the following features. The fuel cell is powered by hydrogen gas produced by the chlor-alkali unit.

An aspect, combinable with any of the other aspects, can include the following features. The mechanical vapor compression unit includes a compressor powered by the marine engine, an evaporator, and a preheating heat exchanger.

An aspect, combinable with any of the other aspects, can include the following features. The chlori-alkali unit produces chlorine gas and hydrogen gas.

An aspect, combinable with any of the other aspects, can include the following features. The acid gas scrubber is at least one of a packed tower, wet-film, impingement-plate or tray-tower scrubber.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
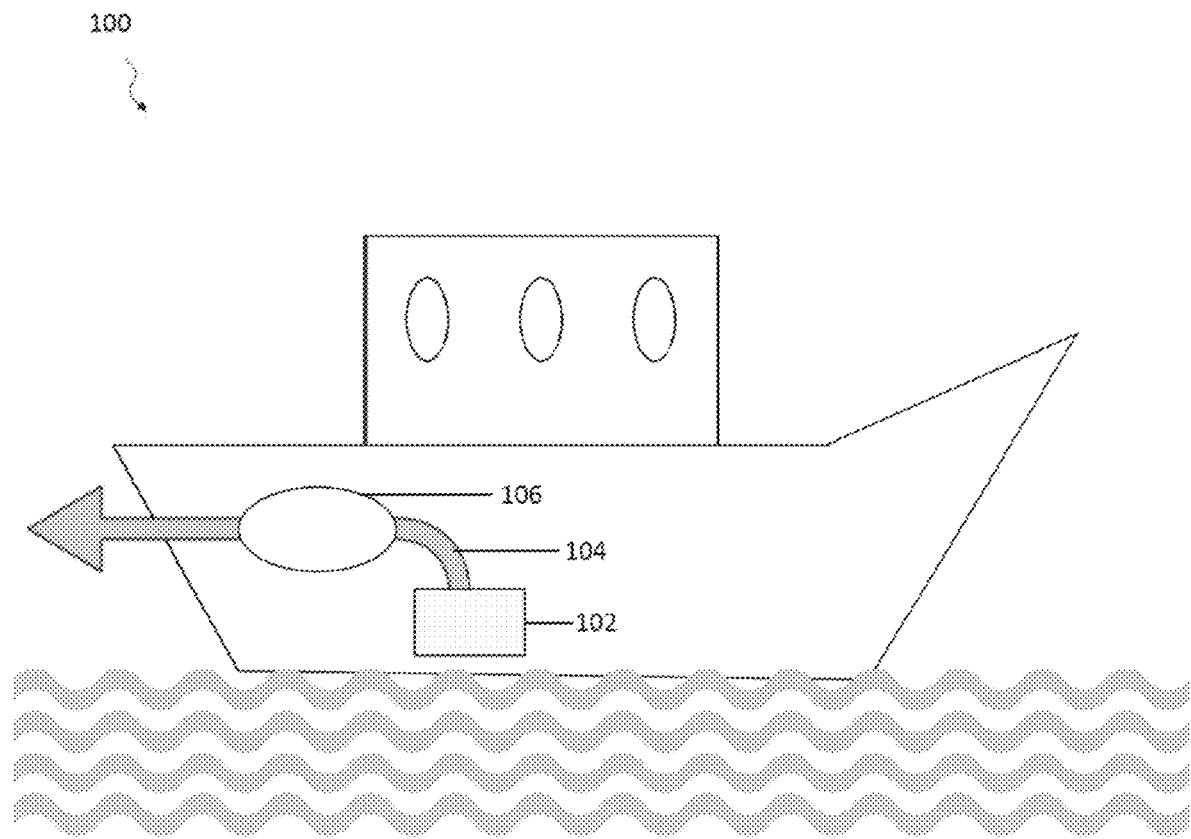
FIG. 1 shows an example of a marine vessel with an exhaust treatment system.
Figure 2:
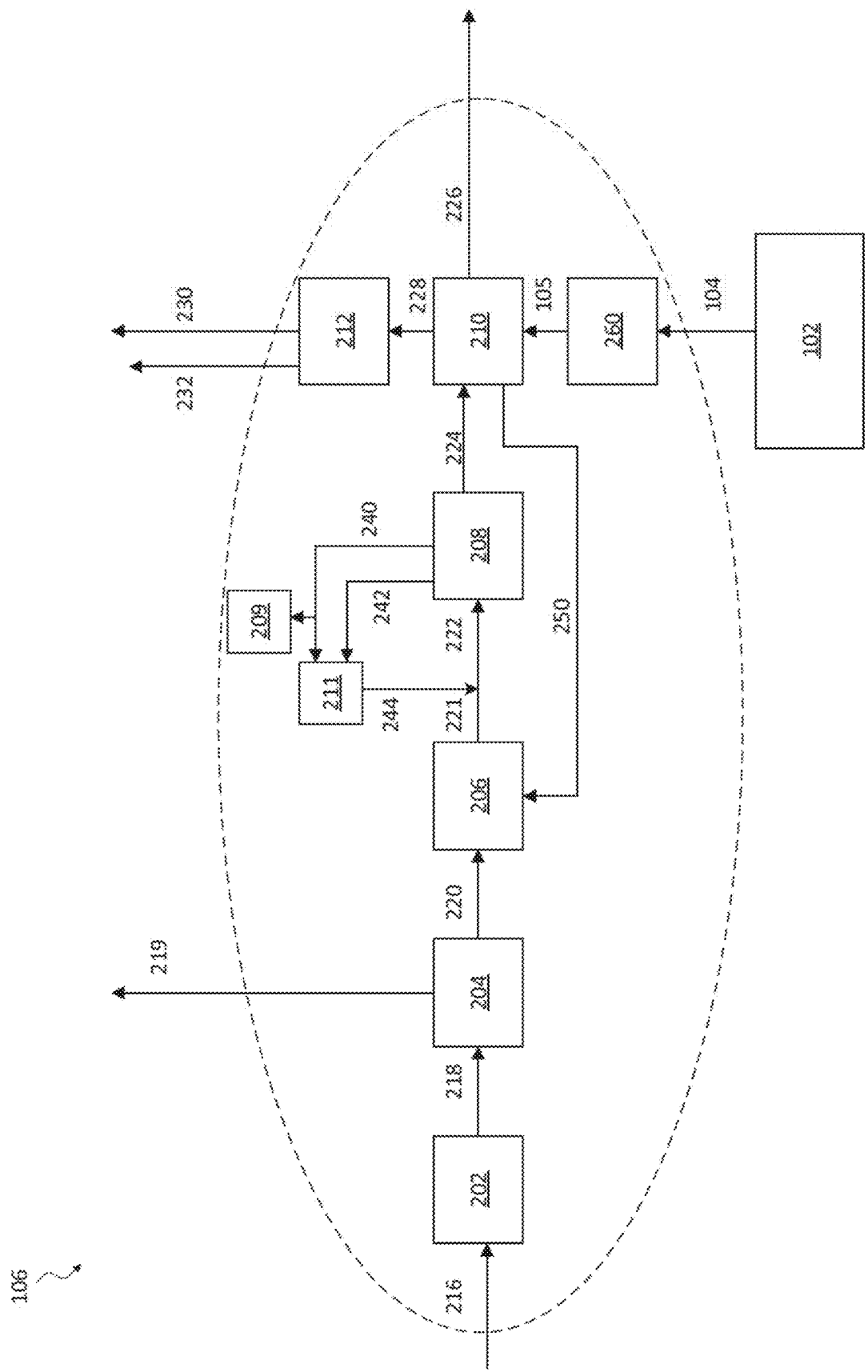
FIG. 2 shows an example of a marine engine exhaust treatment system.

Provided in this disclosure, in part, are methods and an apparatus for treating marine engine exhaust using seawater. FIG. 1 shows an example of a marine vessel 100 which includes an engine 102 that produces engine exhaust 104. The engine exhaust 104 can be treated by the on-board treatment system 106. FIG. 2 shows an example of the on-board treatment system 106. The apparatus for treating the marine engine exhaust can be used aboard a marine vessel 100 that includes an engine 102 which produces engine exhaust 104. The apparatus further includes a purification unit 202 and a concentration unit 204. The apparatus includes a softening unit 206. The apparatus includes a chlor-alkali unit 208 which can be powered by a fuel cell 209. The chlor-alkali process produces sodium hydroxide (NaOH) 224 which can be used in an acid gas scrubber 210 to remove $SO_x$, $NO_x$ and $CO_2$ from the engine exhaust 104. The apparatus can further include a waste heat recovery unit 260 which recovers heat from the engine exhaust 104 and cools the engine exhaust 104 before it reaches the acid gas scrubber 210. In some implementations, the apparatus includes a separator unit 212 to separate the products and byproducts of the acid gas scrubber 210. The apparatus can also include any tubes, pipes, hosing, connectors, valves, fluid connections and manual or computer implemented controls necessary to operate the apparatus.

In some implementations, the on-board treatment system 106 utilizes a portion of seawater 216 obtained from the seawater on which a marine vessel 100 travels. The seawater 216, which naturally contains sodium chloride, is treated with a purification unit 202. The purification unit 202 is configured to remove primarily sulfate ions ($SO_4^{2-}$) and a portion of hard ions, for example, calcium ($Ca^{2+}$) and magnesium ($Mg^{2+}$) ions. The removal of calcium, magnesium and sulfate ions improves the efficiency of the subsequent chlor-alkali process. The purification unit 202 can purify the seawater 216 using nanofiltration. The purification unit 202 yields treated seawater 218.

The treated seawater 218 is processed by a concentration unit 204. The concentration unit 204 concentrates the sodium chloride in the treated seawater 218 to yield a concentrated brine solution 220. The concentrated brine solution can approach sodium chloride saturation, for example, approximately 26% by weight sodium chloride. The concentration unit 204 can use any suitable process to increase the concentration of sodium chloride. For example, the concentration unit 204 can include a one or more of a reverse osmosis process, an electrodialysis process, a multi-stage flash distillation process, a multi-effect distillation process, or a mechanical vapor compression process.

In some implementations, the treated seawater 218 undergoes more than one concentration process to yield the concentrated brine solution 220. These concentration processes can be multiple iterations of the same process, or combinations of more than one type of process depending on several factors, such as the energy requirements, process efficiency, seawater's salinity, equipment sizing, flexibility and others. For example, reverse osmosis process can concentrate the treated seawater 218 with almost minimum thermodynamic energy consumption, due to the implementation of more energy-efficient pumps and improved membranes, whereas electrodialysis could be an alternative to reverse osmosis for low-salinity desalination applications. Moreover, because of the extreme flexibility of the electrodialysis process, it can be coupled with a fuel cell which is powered by hydrogen produced by the chlor-alkali unit. In some implementations, the mechanical vapor compression process concentrates the treated sweater by compressing vapor produced by evaporation using a compressor powered by the marine engine 102, recovering heat from the compressed vapor using a preheating heat exchanger, powering an evaporator using the recovered heat, and evaporating the treated seawater using the evaporator to yield the concentrated brine solution.

In some implementations, concentrating the treated seawater 218 yields potable water 219. The potable water 219 can be utilized on-board or sold as a commodity.

In some implementations, the concentrated brine solution 220 is processed with a chemical softening unit 206 using one or more softeners to yield a treated brine solution 221.

The chemical softening unit 206 further removes hard ions (for example, $Ca^{2+}$ and $Mg^{2+}$). In some implementations, the chemical softening unit 206 uses sodium carbonate ($Na_2CO_3$) and sodium hydroxide (NaOH) to precipitate the $Ca^{2+}$ and $Mg^{2+}$ ions as calcium and magnesium salts. In some implementations, a cation ion-exchange step can further remove hard ions.

Figure 3:
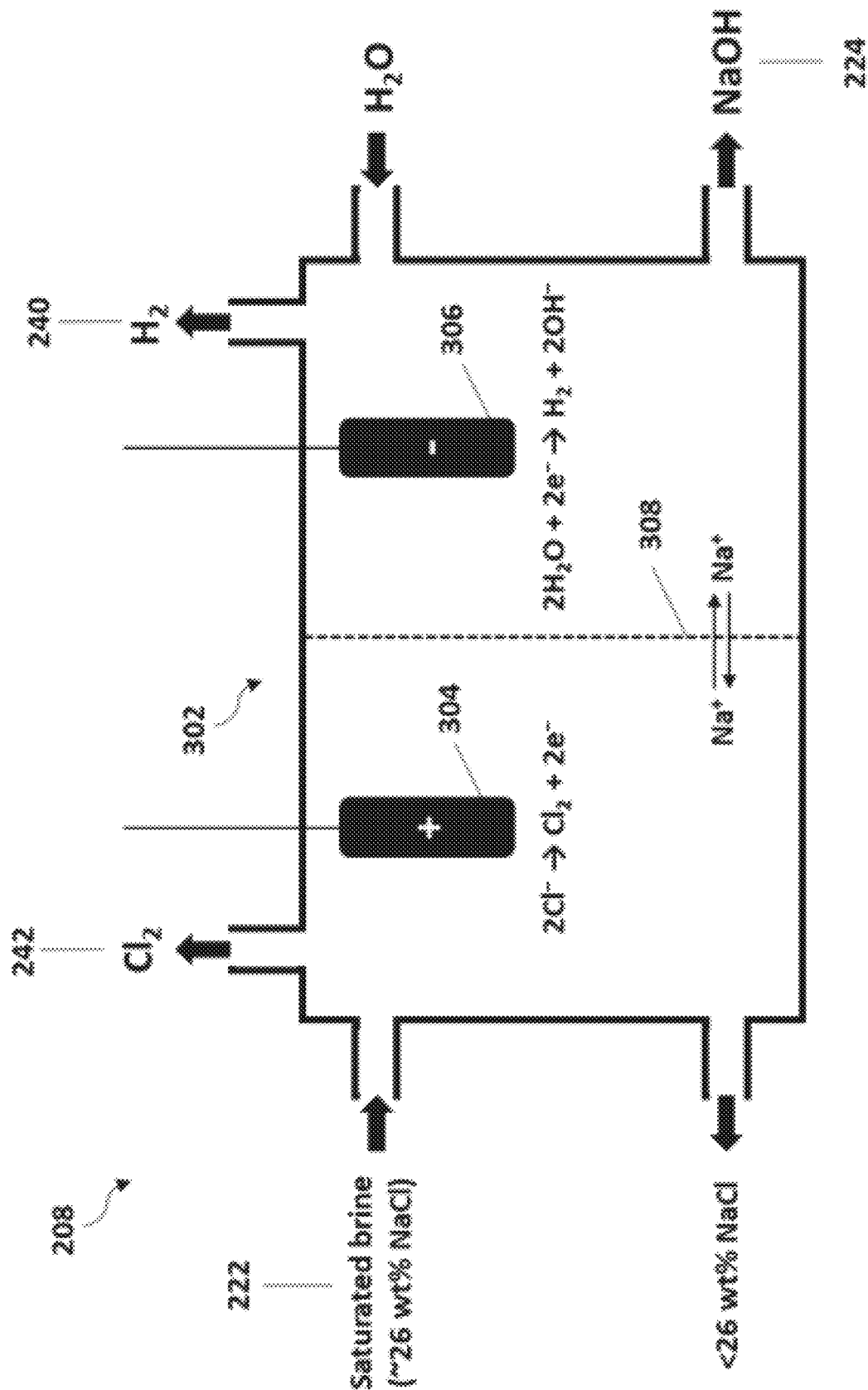
FIG. 3 shows an example schematic of a chlor-alkali unit.

In some implementations, the treated brine solution 221 is acidified, yielding an acidified brine solution 222. The acidified brine solution 222 is treated with a chlor-alkali unit 208. An example schematic of a chlor-alkali unit is shown in FIG. 3. The chlor-alkali unit 208 includes an electrochemical cell 302. The electrochemical cell 302 includes at least one anode 304, at least one cathode 306, and an ion exchange membrane 308. The acidified saturated brine solution 222 enters the electrochemical cell 302. In the electrochemical cell 302, electrolysis results in the generation of chlorine gas ($Cl_2$) 242 at the anode 304, hydrogen gas ($H_2$) 240 at the cathode 306, as shown in the following reactions:

Anode: $2Cl^- \rightarrow Cl_2(g) + 2e^-$

Cathode: $2H_2O + 2e^- \rightarrow H_2(g) + 2OH^-$

The ion exchange membrane 308 allows only the diffusion of sodium cations ($Na^+$) from the anode side to the cathode side, where they react with the hydroxyl anions ($OH^-$) to produce sodium hydroxide 224.

The overall reaction of this process is:

$2NaCl + 2H_2O \rightarrow 2NaOH + H_2 + Cl_2$

In some implementations, the sodium hydroxide 224 is a solution of sodium hydroxide.

In some implementations, the sodium hydroxide 224 is used in the chemical softening unit 206.

In some implementations, the chlorine gas 242 and hydrogen gas 240 can be converted by conversion unit 211. Hydrogen chloride (HCl) gas can be formed in the conversation unit 211 by combustion of hydrogen ($H_2$) and chlorine ($Cl_2$) gas. The hydrogen chloride gas is then absorbed by water to form hydrochloric acid 244. The reaction is represented by the equation:

$H_2 + Cl_2 \rightarrow 2HCl$

Both the reaction and absorption process in water are highly exothermic. In some implementations, the hydrochloric acid 244 can be used to acidify the treated brine solution 221 to yield the acidified brine solution 222.

Alternatively or in combination, the chlorine gas 242 can be combined with the sodium hydroxide 224 to form sodium hypochlorite (NaOCl), also known as bleach. The bleach can be used on-board the marine vessel 100 or sold as a commodity.

Alternatively or in combination, the hydrogen gas 240 can be used to power a fuel cell 209. The fuel call 209 can be used to power part of the apparatus. For example, the fuel cell 209 can be used to power an electrodialysis process in the concentration unit 204.

Alternatively or in combination, the hydrogen gas 240 can be used to power combustion in the marine engine 102.

Alternatively or in combination, the hydrogen gas 240, the chlorine gas 242, or both gasses can be sold as a commodity.

In some implementations, the sodium hydroxide 224 produced by the chlor-alkali unit 208 reacts with the exhaust gas 104 from the marine engine 102 in an acid gas scrubber 210. The acid scrubber 210 can be a packed tower unit, wet-film, impingement-plate, tray-tower, or other type of scrubber unit.

In some implementations, a waste heat recovery unit 260 is used to cool the engine exhaust 104 to a cooled engine exhaust 105 before the engine exhaust enters the acid gas scrubber 210.

In the acid gas scrubber 210 the sodium hydroxide 224 reacts with $CO_2$, $SO_x$, and $NO_x$ in the engine exhaust gas 104 or alternatively with the cooled engine exhaust gas 105 to yield product and byproducts. For example, the $SO_x$ and $NO_x$ in the engine exhaust gas 104 or cooled engine exhaust gas 105 react with the sodium hydroxide 224 to form sodium sulfates and sodium nitrates, for example, $Na_2SO_4$ and $NaNO_3$. The $CO_2$ in either the exhaust gas 104 or the cooled exhaust gas 105 reacts with the sodium hydroxide 224 to form sodium carbonate ($Na_2CO_3$) and sodium bicarbonate ($NaHCO_3$) 250. Some of the products and byproducts of the acid scrubbing process have commercial applications, and can be sold as commodities. For example, the generated sodium bicarbonate 250 can be sold as baking soda, used in algae biofuels production, or used in glass manufacture. Alternatively, the sodium bicarbonate 250 can be safely landfilled, used for mine backfilling, or used as a road base. The generated sodium sulfate ($Na_2SO_4$) can be used as filler in laundry detergents, or used in the glass industry. The generated $NaNO_3$ can be used for making potassium nitrate, fertilizers, explosives, in the production of high-strength glass, in some pharmaceuticals, or as the raw material for the production of nitric acid.

In some implementations, the sodium carbonate 250 generated by the acid gas scrubber unit 210 is used as a softener in the chemical softening unit 206.

The products and byproducts of the acid gas scrubber unit 210 also include a mixture of solid and liquid products and byproducts 228 and clean exhaust 226.

In some implementations, the output of the acid gas scrubber unit 210, that is, the mixture of solid and liquid products and byproducts 228, are separated using a separating unit 212. The separating unit 212 can separate solid products 230 from other products and byproducts, for example from the spent brine solution 232.

Figure 4:
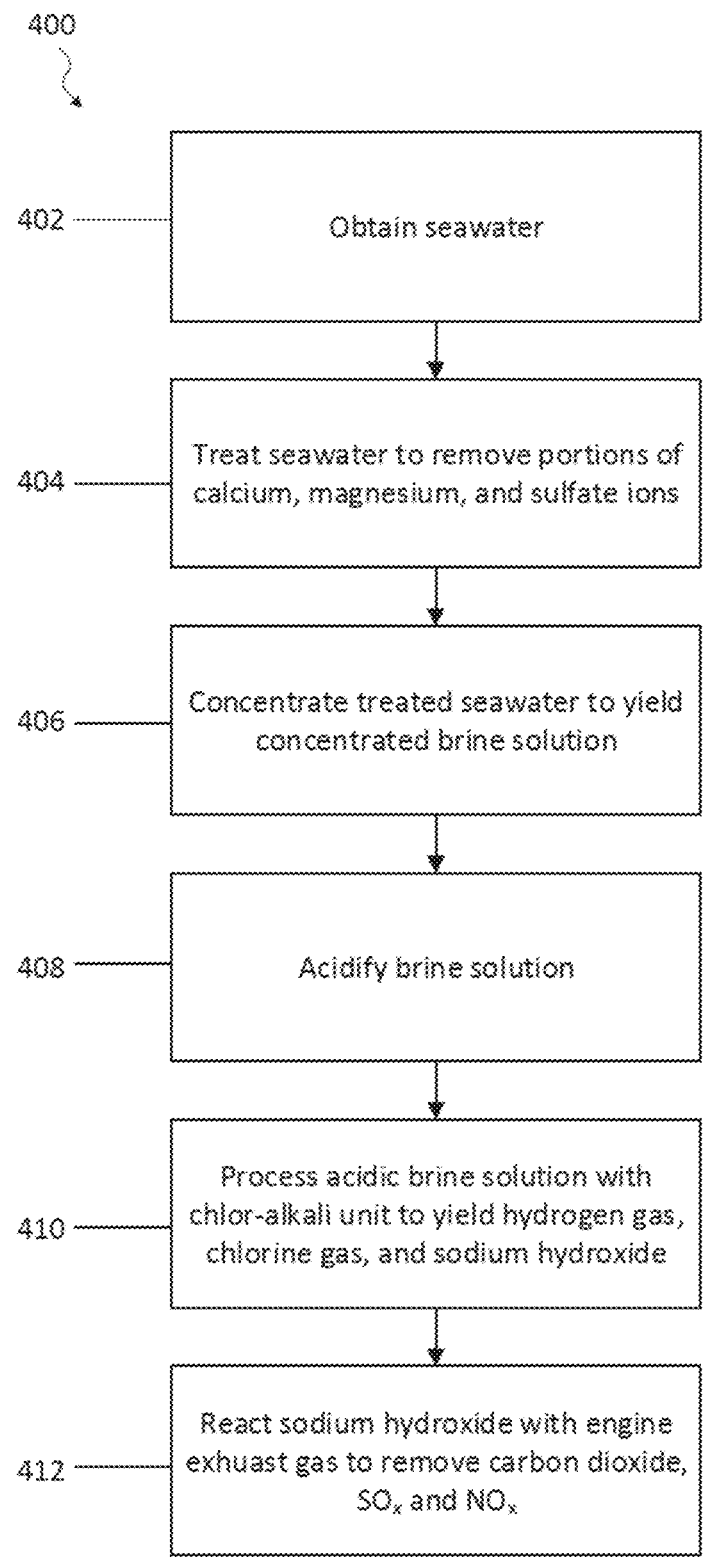
FIG. 4 is flowchart showing an example method of treating marine engine gas using seawater.

FIG. 4 is a flowchart showing an example method of treating marine engine exhaust 104 using an on-board treatment system 106. At 402, seawater 216 is obtained from the seawater on which the marine vessel 100 travels. At 404, the seawater 216 is treated to remove portions of calcium, magnesium, and sulfate ions. At 406, the treated seawater 218 is concentrated to yield a concentrated brine solution 220. At 408, the concentrated brine solution is acidified. At 410, the acidified brine solution 222 is processed with a chlor-alkali unit 208 to yield hydrogen gas 240, chlorine gas 242, and sodium hydroxide 224. At 412, the sodium hydroxide 224 is reacted with the engine exhaust gas 104 to remove carbon dioxide, $SO_x$ and $NO_x$ from the engine exhaust gas 104.

Reference has been made in detail to certain embodiments of the disclosed subject matter, examples of which are illustrated in part in the accompanying drawings. While the disclosed subject matter is described in conjunction with the enumerated claims, it will be understood that the exemplified subject matter is not intended to limit the claims to the disclosed subject matter.

The term "about" as used in this disclosure can allow for a degree of variability in a value or range, for example, within 10%, within 5%, or within 1% of a stated value or of a stated limit of a range.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

A number of implementations of the disclosure have been described. Nevertheless, it will be understood that various modifications can be made without departing from the spirit and scope of the disclosure.

What is claimed is:

1. A method for treating engine exhaust gas emitted by a marine engine onboard a marine vessel, the method comprising:
onboard the marine vessel:
treating a portion of seawater on which the marine vessel travels to yield a concentrated brine solution;
treating the concentrated brine solution with a softener to yield a treated brine solution;
acidifying the treated brine solution to yield an acidic brine solution;
processing the acidic brine solution to yield sodium hydroxide; and
reacting the sodium hydroxide in a scrubber unit with the engine exhaust gas to remove carbon dioxide, $SO_x$ and $NO_x$ from the engine exhaust gas.

2. The method of claim 1, wherein treating the portion of seawater to yield the concentrated brine solution comprises:
removing portions of calcium, magnesium and sulfate ions from the portion of seawater; and
concentrating the portion of seawater from which the portions of calcium, magnesium and sulfate ions have been removed.

3. The method of claim 1, wherein processing the acidic brine solution additionally yields hydrogen gas and chlorine gas.

4. The method of claim 3, wherein concentrating the treated portion of the seawater comprises concentrating with the electrodialysis process powered by a fuel cell, wherein the fuel cell is powered with hydrogen gas produced by the chlor-alkali unit.

5. The method of claim 3, wherein concentrating the treated portion of the seawater comprises concentrating the treated portion of the seawater with a mechanical vapor compression process, wherein the mechanical vapor compression process comprises:
compressing vapor produced by evaporation using a compressor, wherein the compressor is powered by the marine engine;
recovering heat from the compressed vapor using a preheating heat exchanger;
powering an evaporator using the recovered heat; and
evaporating the treated portion of the seawater using the evaporator to yield the concentrated brine solution.

6. The method of claim 1, wherein concentrating the treated portion of the seawater comprises increasing the concentration of sodium chloride in the treated portion of the seawater up to 26% by weight to yield the concentrated brine solution.

7. The method of claim 1, further comprising converting the chlorine gas and hydrogen gas generated by the chlor-alkali process into hydrochloric acid, and acidifying the treated brine solution using the hydrochloric acid.

8. The method of claim 1, further comprising reacting the chlorine gas with sodium hydroxide to yield sodium hypochlorite.

9. The method of claim 1, wherein the hydrogen gas generated by the chlor-alkali process is combusted in the marine engine.

10. The method of claim 1, wherein reacting the sodium hydroxide in the scrubber unit with the engine exhaust gas yields sodium bicarbonate.

11. The method of claim 10, wherein the sodium bicarbonate is used as the softener to treat the concentrated brine solution.

12. The method of claim 1, wherein the engine exhaust gas passes through a waste heat recovery unit before the engine exhaust gas is reacted with the sodium hydroxide, and heat is recovered from the engine exhaust gas by the waste heat recovery unit.

13. The method of claim 12, wherein the heat recovered from the waste heat recovery unit is utilized by the mechanical vapor compression process.

14. The method of claim 1, wherein reacting the sodium hydroxide and the engine exhaust gas yields solid and liquid products and byproducts, and further comprising separating the solid and liquid products using a separation unit.

15. The method of claim 1, wherein reacting the sodium hydroxide in a scrubber unit comprises reacting the sodium hydroxide in at least one of a packed tower, wet-film, impingement-plate or tray-tower scrubber.

16. A system for treating an engine exhaust gas emitted by a marine engine onboard a marine vessel using a portion of seawater from the seawater on which the marine vessel travels, comprising:
a treatment system configured to:
treat a portion of seawater on which the marine vessel travels to yield a concentrated brine solution, and
treat the concentrated brine solution with a softener to yield a treated brine solution;
a chemical softening unit configured to further remove calcium and magnesium ions from the concentrated brine solution to yield a treated brine solution;
an acidifying unit configured to acidify the treated brine solution to yield an acidic brine solution;
a chlor-alkali unit configured to process the acidic brine solution to yield sodium hydroxide;
an acid gas scrubber configured to react the sodium hydroxide with engine exhaust gas; and
a separator configured to separate the solid and liquid products and byproducts that are generated by the reaction of sodium hydroxide and engine exhaust gas.

17. The system of claim 16, wherein the treatment system comprises:
a treatment unit configured to remove portions of calcium, magnesium and sulfate ions from the portion of the seawater to yield a treated portion of the seawater; and
one or more concentration units configured to concentrate the treated portion of the seawater to yield the concentrated brine solution.

18. The system of claim 16, wherein the chlor-alkali unit is configured to electrolyze sodium chloride in the acidic brine solution to yield the sodium chloride and to additionally yield hydrogen gas and chlorine.

19. The system of claim 18, wherein the fuel cell is powered by hydrogen gas produced by the chlor-alkali unit.

20. The system of claim 16, wherein the mechanical vapor compression unit comprises:
a compressor powered by the marine engine;
an evaporator; and
a preheating heat exchanger.

* * * * *